Figures 1, 2, 3, 4, 5:
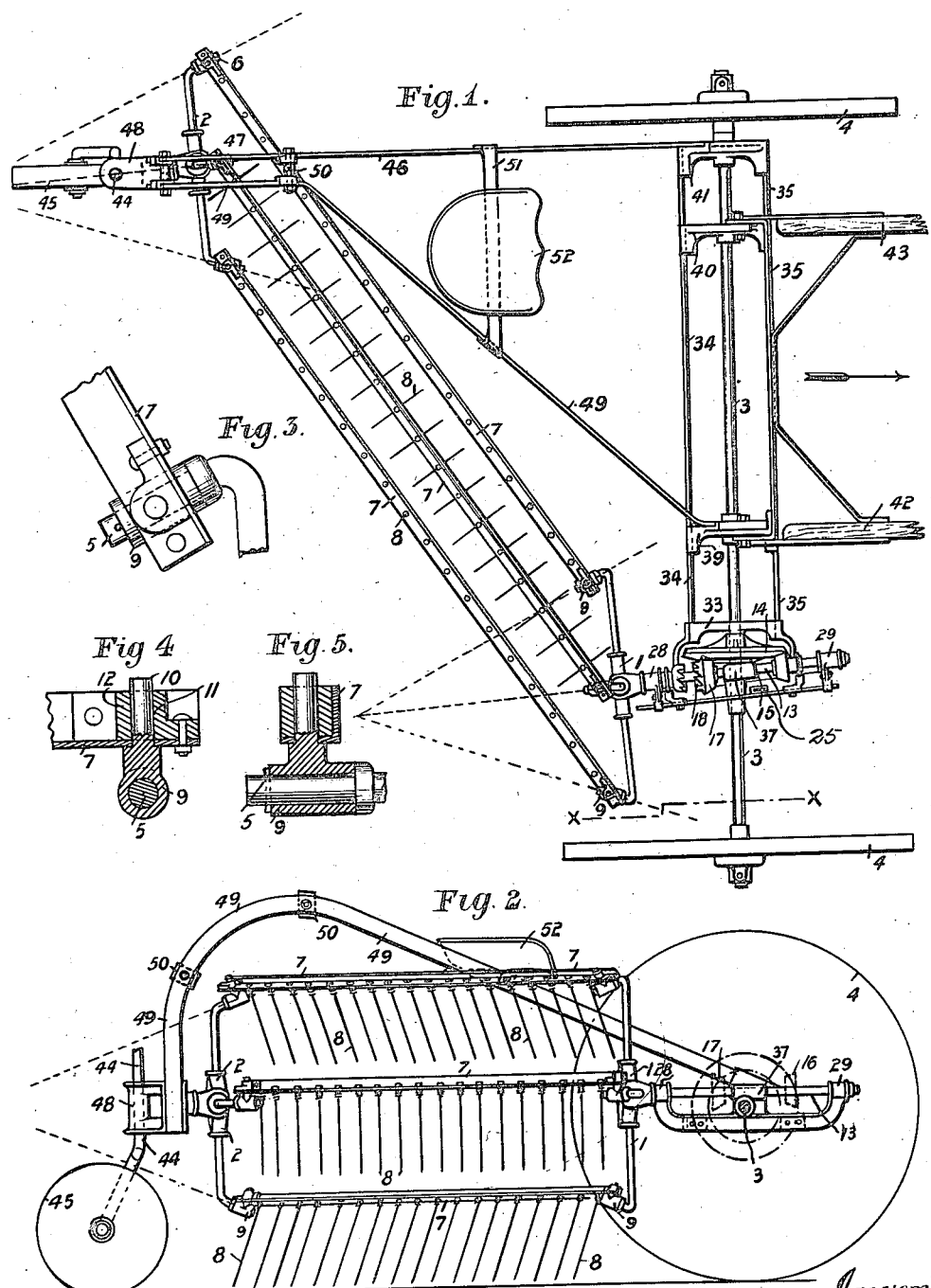

J. & C. J. BAMFORD.
SIDE DELIVERY RAKE.
APPLICATION FILED OCT. 10, 1913.

1,195,172.

Patented Aug. 22, 1916.
3 SHEETS—SHEET 1.

Witnesses
John C. Sanders
Albert F. Howman

Inventors
Joseph Bamford
Cyril Joseph Bamford
By Wm. Wallace White
ATTY

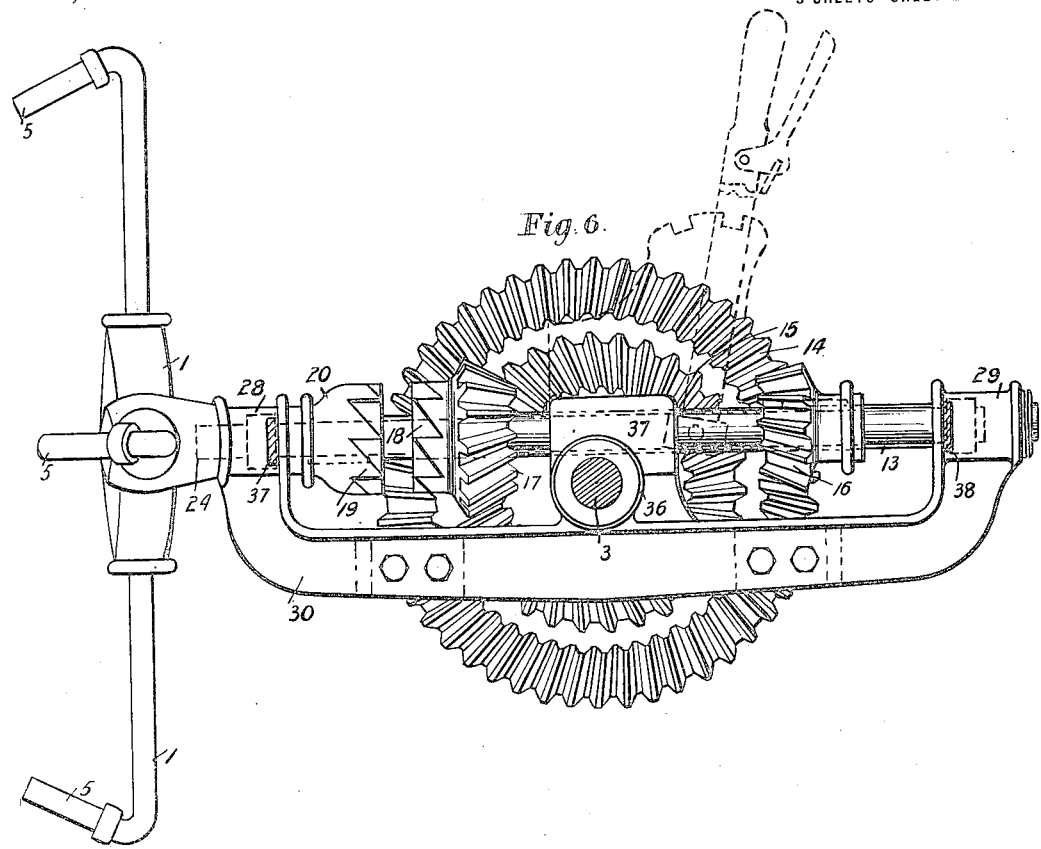
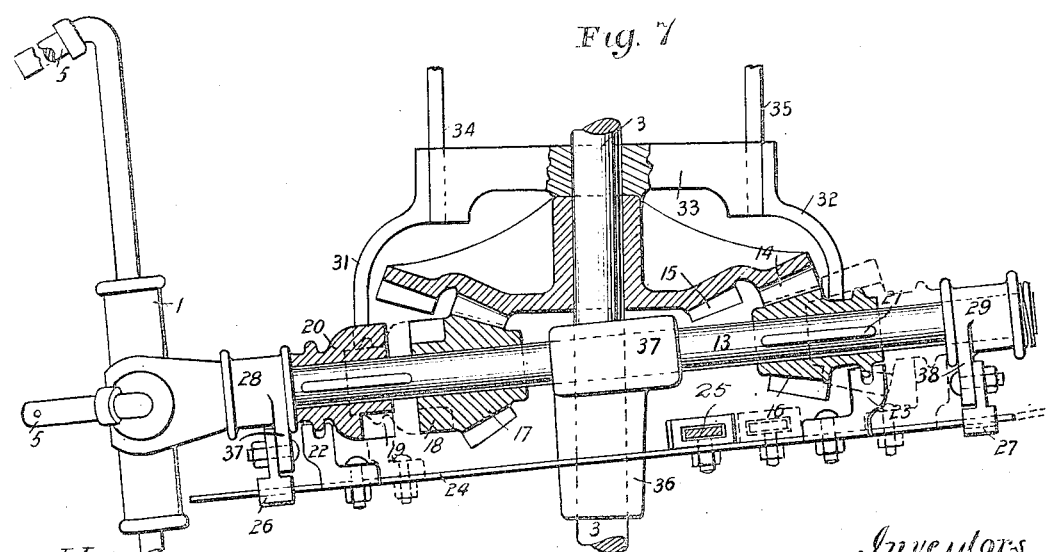

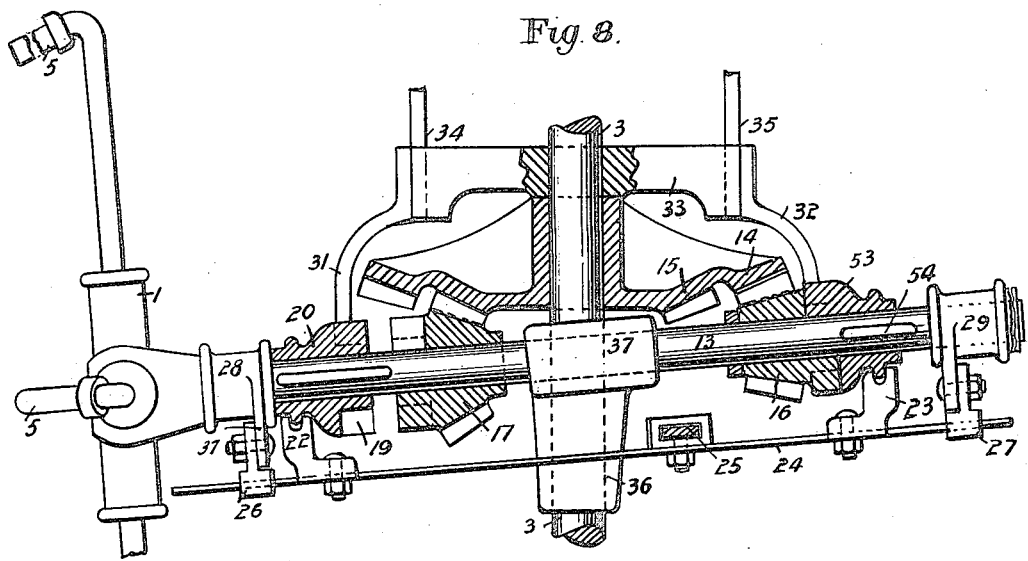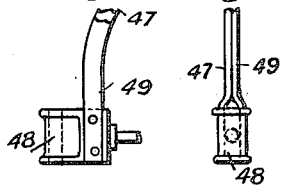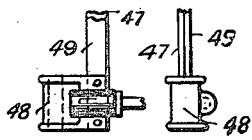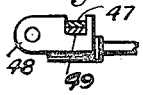

UNITED STATES PATENT OFFICE.

JOSEPH BAMFORD AND CYRIL JOSEPH BAMFORD, OF UTTOXETER, ENGLAND.

SIDE-DELIVERY RAKE.

1,195,172.  Specification of Letters Patent.  Patented Aug. 22, 1916.

Application filed October 10, 1913. Serial No. 794,363.

*To all whom it may concern:*

Be it known that we, JOSEPH BAMFORD and CYRIL JOSEPH BAMFORD, subjects of His Majesty the King of Great Britain and Ireland, residing at St. Mary's Mount, Uttoxeter, in the county of Stafford, England, have invented new and useful Improvements in Side-Delivery Rakes, of which the following is a specification.

Our invention relates to improvements in side delivery rakes of that type in which there are two reels or spiders arranged eccentrically to each other and connected together by rake bars carrying the tines which latter always point downwardly as they revolve, said reels or spiders and rake bars being arranged either at the rear or at the front of the road wheels with the axle of the driven reel or spider receiving power and rotary motion through gearing from the road wheel axle.

The objects of our invention are:—Firstly to provided improved means for obtaining combined endwise and swinging motion of the rake bars and tines as they are carried around so as to increase the sweep or traverse of the pendent tines during the effective portion of their travel; secondly to provide an improved gearing for transmitting power and rotary motion from the road wheel axle to the axle of the driven reel or spider and to cause the reel or spider and the rake bars and tines to revolve at a comparatively slow speed for raking, the tines moving the material toward one side of the machine and at a considerably higher speed for tedding, the tines then moving the material toward the other side of the machine; and thirdly to so construct the framework of the said machine that while being light said framework will be perfectly rigid so as to resist the side and torsional strains to which it is subjected when the machine is at work particularly when running over uneven ground. We attain these objects by the mechanism illustrated by the accompanying drawings of which—

Figure 1 is a plan of the main portion of a side delivery rake embodying our invention; Fig. 2 is a side elevation of the same partly in section; Fig. 3 is a plan on a larger scale of the outer end of one of the arms of one of the reels or spiders showing the connection of the rake bars thereto; Fig. 4 is a sectional front elevation of the same connection; and Fig. 5 is a sectional side elevation of the same; Fig. 6 is a side elevation partly in section of the gearing which transmits power and rotary motion from the road wheel axle to the driven reel or spider, this view also showing the said reel or spider on the road wheel axle; and Fig. 7 is a sectional plan of the parts illustrated in Fig. 6. Fig. 8 is a sectional plan illustrating a modification of the mechanism shown in Fig. 7; Figs. 9 and 10 are respectively side and end elevations of a modified arrangement of the lower extremities of the braced stays having their ends forked apart and the bracket wherein is mounted the caster wheel piece in the forked portion; Figs. 11, 12 and 13 are respectively a side elevation, end elevation and part sectional plan of a further modification of the lower extremities of the braced stays having their ends butted together and the bracket wherein is mounted the caster wheel secured thereto.

The same letters and figures of reference indicate the same or similar parts throughout the various figures.

The two revolving reels or spiders carrying the rake bars are marked respectively 1, 2. They are both of substantially the same diameter and they are arranged eccentrically to one another and (in the machine shown) with the reel or spider 1 in advance of the reel or spider 2. The reel 1 receives rotary motion from the axle 3 of the road wheels 4 preferably by the mechanism hereinafter described. In order to obtain the said combined endwise and swinging motion of the rake bars and tines as they are carried around, the pins 5 of the reel 1 and the pin 6 of the reel 2 on which the rake bars 7 turn are not arranged parallel with the axis of the reels or spiders 1, 2, respectively, as is usual, but are inclined thereto, the pins 5 of the wheel 1 carrying one end of each of the rake bars 7 being inclined toward the face of the reel 1 as indicated by the dotted lines and the pins 6 of the other reel 2 carrying the other ends of the rake bar 7 being inclined outwardly from the face of the reel 2 as indicated by the dotted lines and thus it follows that as the reels 1, 2, revolve at the same speed and the pins 5, 6, make various angles with the substantially horizontal rake bars 7 carried thereby, axial rocking or swinging movements of the rake bars 7 and the tines 8 fixed thereto are the result. The mounting of the rake bars 7 on the pins 5, 6, is preferably effected by each of the pins 5, 6, having an eye or bearing 9 mounted and adapted to turn on it and furnished with an upwardly projecting stem 10 (see Figs. 3, 4, and 5) at about right angles to the eye 9 which stem 10 passes through a hole or bearing 11 in the rake bar 7 and in the bearing block 12 fixed thereto so that as the reels 1, 2, revolve the eyes or bearings 9 turn on the endwise pins 5, 6, and the rake bars 7 can also turn to some extent on the shanks 10 and thus accommodate themselves to the various positions which they have to take as the reels 1, 2, revolve.

It will be evident that instead of the swivel bearing connection of the rake bars 7 to the reels or spiders 1, 2, being constructed by endwise pins 5, 6, on the reels engaging in eyes or bearings 9 carrying the rake bars this arrangement may be reversed that is to say, the rake bars 7 may be made with swivel pins arranged to turn in endwise inclined bearings or bosses on the reels 1, 2. In this case the pins can each be made cranked with one part mounted and adapted to revolve in an inclined bearing on the end of the arm of the reel and with the other arm of the crank passing upwardly through the bearing block 12 in the rake bar 7, or the rake bar 7 may be otherwise connected thereto so that the rake bar can swivel on the pins.

In order to enable the axis 13 of the reel or spider 1 to be arranged above the road axle 3 and continued across the same for strength and stability, we employ bevel wheels having skew teeth for transmitting power and rotary motion from the road axle 3 to the reel axle 13. When, as in the machine illustrated, the reels and rake bars are required to revolve at a comparatively slow speed for side raking or to revolve in the opposite direction at a higher speed for tedding then this skew bevel gearing comprises two skew bevel wheels and two pinions of which the two skew bevel wheels are marked respectively 14, 15, and are preferably cast in one piece and are fixed on the road axle 3 so as to revolve therewith while the two skew bevel pinions 16, 17, gearing with the bevel wheels 14, 15, respectively are mounted on the reel or spider axle 13. The two skew bevel pinions 16, 17, are arranged at opposite sides of the road axle 3 and are both of nearly the same diameter, the bevel pinion 17 being however slightly larger than the skew bevel pinion 16 owing to the fact that the reel axle 13 is in the arrangement shown not quite at right angles to the road axle 3. The bevel wheel 14 which gears with the pinion 16 is of considerably larger diameter than the bevel wheel 15 which gears with the pinion 17. Thus the reel or spider axle 13 will be driven through the bevel wheel 15 and pinion 17 of low ratio for raking the tines moving the material to the left of the machine and will be revolved in the opposite direction for tedding at a considerably higher speed by the bevel wheel 14 and pinion 16 of greater ratio, the tines turning and moving the material toward the right of the machine.

Means are provided for one or other of the skew bevel pinions 16, 17, to drive the reel or spider axle 13 while the other bevel pinion is inoperative. This is preferably effected by the pinion 17 being mounted to revolve loosely on the axle 13 and made with clutch teeth 18 at the back adapted to engage with the teeth 19 of the clutch 20 which is slidably mounted as on a feather on the axle 13. The other pinion 16 is mounted to slide on the axle 13 and connected thereby by the feather 21. The clutch 20 and pinion 16 are respectively engaged by the clutch forks 22, 23, fixed on the sliding clutch bar 24 operated by a hand lever 25 and mounted to slide in side brackets 26, 27, fixed on the bearings 28, 29, in which the reel axle 13 revolves. By means of the hand lever 25 the clutch bar 24 can be slid to the position shown in Figs. 6 and 7 where the pinion 16 is in gear with the wheel 14 so that the reel or spider axle 13 is then being driven so as to cause the tines to move in a forward direction the other pinion 17 meanwhile being out of gear with the clutch 20 and revolving idly on the axle 13. When the clutch bar 24 is by the handle 25 moved as far as it will go in the opposite direction, that is toward the right hand as shown in Figs. 6 and 7, the bevel wheel 14 is moved out of gear and the clutch 20 is brought into gear with the clutch part of the pinion 17 so that the latter is now connected to the reel axle 13 which is now driven by the bevel wheel 15 and pinion 17 so as to cause the tines to move in the backward direction for raking. In the intermediate position of the clutch bar 24 the gearing is neutral and inoperative as both the clutch 19 and the pinion 16 are then out of gear.

The means for carrying the reel or spider axle 13 and the clutch bar 24 for operating the clutches and sliding pinion comprises a cross bracket 30 arranged underneath the reel axle 13 and on which are formed the reel axle bearings 28, 29, these bearings being outside the clutch levers 22, 23, at a convenient distance apart from the road axle 3. This bracket 30 is bolted to the end portions of two side arms 31, 32, which are formed with the bracket 33 fixed to the side bars 34, 35, of the machine frame. This bracket 30 has formed with it a bearing 36 through which the road axle 3 passes and formed with the upper part of this bearing 36 there is a boss or bearing 37 for the reel axle 13 thus maintaining the latter in its proper relative position to the road axle 3 and forming a rigid connection of the one to the other. The bearings 28, 29, at the ends of the bracket 30 are formed with side brackets 37, 38, to which are bolted the bearings 26, 27, for carrying the slide bar 24 to which are fixed the clutch forks 22, 23, or like parts for operating the sliding clutch 20 and the pinion 16 to move the same in or out of gear as aforesaid.

As a modification instead of the skew bevel pinion 16 being arranged to slide in or out of gear with the bevel wheel 14 the said pinion 16 may be arranged to be constantly in gear with the bevel wheel 14 and revolve loosely on the reel axle 13 and be provided with clutch teeth and a sliding clutch similar to that above described in connection with the pinion 17, see Fig. 8, wherein the skew bevel pinion 16 is in connection with a clutch 53 slidably and rotatably mounted on the reel axle 13 by means of a feather 54, the clutch 53 being operated by the clutch fork 23 secured to the sliding bar 24 controlled by the hand lever 25 in a similar manner to that already described with reference to the bevel pinion 17 and clutch 20, and it will be observed that when the clutch 53 is in connection with the bevel pinion 16 the clutch 20 is out of clutch connection with the bevel pinion 17, and that when the clutch 20 is in connection with the bevel pinion 17 the clutch 53 is out of connection with the bevel pinion 16. By this means reverse rotation at different speeds is imparted to the reel axle 13 from the road axle 3.

When the machine is constructed only for side raking and not for tedding then only the one skew bevel wheel 15 and pinion 17 are employed as will readily be understood.

The portion of the framework of the machine which is adjacent to the road wheel axle 3 and is carried thereby is an oblong frame having the two longer sides 34, 35, parallel with one another and formed of two flat section or other bars or tubes bolted or riveted together by means of cross brackets such as 33, 39, 40, 41, fitting between these bars or tubes 34, 35, and forming bearings for the road axle 3 which latter is situated midway between the bars 34, 35. The two intermediate brackets 39, 40, serve for the attachment of the horse shafts 42, 43, of the machine. The machine illustrated on our drawings travels in the direction indicated by the arrow in Fig. 1.

The horn piece 44 of the caster wheel 45 and the rear reel or spider 2 which stand out some distance at the back of the road wheels 4 are carried by an arrangement of braced stays from the somewhat rectangular frame formed by the bars 34, 35, and the end cross brackets 33, 41. These braced stays have to be so constructed as to clear the rake bars 7 (and the stripping bars or guards when such are used) and also have to carry the axle of the back reel or spider 2 which is arranged near the caster wheel 45. We construct these braced stays as follows:—From that side of the frame which is almost in line with the caster wheel there is a bar 46 of flat section or channel section or other suitable section or a stout tube which is bolted or otherwise fixed to the end bracket 41 of the rectangular frame part and projects backwardly and is bent upwardly in an inclined direction (see Fig. 2) to clear the spider 2 and rake bars 7 and then near its end part is bent downwardly at 47 to the bracket 48 which carries the caster wheel horn piece 44 and the axle or pin of the reel or spider 2. There is a diagonal stay 49 of somewhat similar construction extending from the bracket 39 near the side of the frame by the gearing of the front reel axle 13, and this stay 49 is bent up over the rake bars 7 and over the reel or spider 2 and then bent downwardly at the side of the first stay 46 but preferably not quite close thereto and between these two downwardly projecting parts one or more distance blocks 50 or the like are placed and there fixed by bolts, rivets or the like passing through the two downwardly projecting end portions of the stays 46, 49, and through blocks 50 thus making this downwardly projecting part of skeleton girder shape which is a strong construction to resist the torsional or other strains. The two stays 46, 49, are also connected together by a tie piece 51 the ends of which are bent over and riveted to the two stays 46, 49. This tie piece 51 may carry the driver's saddle 52. The lower distance block for the downwardly projecting ends of the stays 46, 49, is formed by the bracket 48 which as aforesaid fixes together the bottom ends of the downwardly projecting ends of the two stays 46, 49, and also forms the bracket which carries the axle of the back reel or spider 2 and also has a vertical boss 48 for the vertical axle 44 of the horn piece of the caster wheel.

As a modification, the distance blocks, 50, may be omitted and the two downwardly projecting parts 46, 49, of the stays be bolted or fixed close together face to face for the whole or a portion of their downwardly projecting length, the bracket for the axle pin of the reel or spider 2 also forming the vertical bearing for the vertical pin of the horn piece 44 being fixed to the one or both sides of the lower ends of these downwardly projecting bars 46, 49, as illustrated by Figs. 11, 12 and 13 of the accompanying drawings. In these illustrations the downwardly projecting extremities 47, 49 are butted and secured together and have the brackets 48 secured to the butted ends. As a further modification we may employ the construction shown in Figs. 9 and 10 wherein the lower ends of the downwardly projecting parts 47 and 49 are bent apart to form a fork in which fork is located and fixed the bracket 48. Any of these constructions and arrangements of the braced stays 47 and 49 for supporting the caster wheel bracket and the axis of the rearwardly disposed reel or spider are very light and strong.

What we claim as our invention and desire to secure by Letters Patent is:—

1. In a side delivery rake of the type having two reels arranged eccentrically to each other and revolubly connected by tine bars having pendent tines, the combination of pins or bearings on each reel oppositely inclined to the axes of the reels whereby the tine bars and pendent tines are caused to rock or swing during rotation.

2. In a side delivery rake of the type having two reels arranged eccentrically to each other and revolubly connected by tine bars having pendent tines, the combination of pins or bearings on each reel oppositely inclined to the axes of the reels and mechanism for driving the reels at the same speed from the road axle.

3. In a side delivery rake of the type having two reels arranged eccentrically to each other and revolubly connected by tine bars having pendent tines, the combination of pins or bearings on said reels oppositely inclined to the axes of the reels, said pins or bearings connecting the tine bars and reels, said inclined pins being located in eyes or bearings, said eyes or bearings having a stem thereon adapted to turn on said inclined pins, said stems being located in holes in the tine bars and in bearing blocks secured to the tine bars.

4. In a side delivery rake of the type having two reels arranged eccentrically to each other and revolubly connected by tine bars having pendent tines, the combination of bevel wheels having skew teeth, said bevel wheels being mounted on the road axle and gearing with bevel pinions having skew teeth mounted on the reel or spider axle which is disposed above the road axle.

5. In a side delivery rake of the type having two reels arranged eccentrically to each other and revolubly connected by tine bars having pendent tines, the combination of gearing for driving the reel or spider axle from the road axle comprising two skew bevel wheels of different diameters fixed on the road axle, two skew bevel pinions gearing with said bevel wheels, said bevel pinions being mounted on the reel or spider axle, mechanism whereby one or other of said skew bevel pinions can be caused to engage with and be driven by one or other of the bevel wheels to rotate the reel axle.

6. In a side delivery rake of the type having two reels arranged eccentrically to each other and revolubly connected by tine bars having pendent tines, the combination of gearing for driving the reel axle from the road axle comprising two skew bevel wheels of different diameters fixed on the road axle, two skew bevel pinions mounted on the reel or spider axle, one of said skew bevel pinions being always in gear with one of the bevel wheels, clutch mechanism whereby said pinion can be positively engaged with the reel axle.

7. In a side delivery rake of the type having two reels arranged eccentrically to each other and revolubly connected by tine bars having pendent tines, the combination of gearing for driving the reel axle from the road axle, comprising two skew bevel wheels fixed on the road wheel axle, two skew bevel pinions mounted on the reel axle, one of said pinions being slidably mounted on said axle so as to gear with the larger bevel wheel or be disengaged therefrom, the other bevel pinion having clutch connection with the reel axle whereby the reel axle is driven in the opposite direction.

8. In a side delivery rake of the type having two reels arranged eccentrically to each other and revolubly connected by tine bars having pendent tines, the combination of gearing comprising two skew bevel wheels fixed on the road wheel axle, two skew bevel pinions loosely mounted on the reel axle, said bevel pinions having alternative clutch connection to the reel axle whereby the reel is rotated in opposite directions at different speeds.

9. In a side delivery rake of the type having two reels arranged eccentrically to each other and revolubly connected by tine bars having constantly pendent tines, the combination of pins on the two reels oppositely inclined to the respective axes of the reels, a metal framework positioned at each side of the road wheel axle and parallel thereto, cross brackets connected to said framework having bearings therein for the road wheel axle, said framework and brackets carrying at one end the axle of the inwardly disposed reel, gearing for transmitting rotary motion from the road wheel axle to the reel axle, braced stays connected to said framework and cross brackets extending rearwardly and inclined upwardly for a part of their length and tapering toward each other, said stays being bent downwardly toward their rearward ends and both continued and fixed to a bracket, said bracket having mounted therein the horn of the caster wheel and the pin on which the rearwardly disposed reel revolves.

10. In a side delivery rake of the type having two reels arranged eccentrically to each other and revolubly connected by tine bars having pendent tines, the combination of bevel wheels having skew teeth, said bevel wheels being mounted on the road axle and gearing with bevel pinions having skew teeth mounted on the reel or spider axle which is disposed above the road axle, said reel or spider axle being carried by a bracket forming one end of a metal framework disposed around the road wheel axle and having its side bars arranged on either side of the said axle and parallel therewith, said side bars being connected by cross brackets having bearings therein for the road wheel axle.

11. In a side delivery rake of the type having two reels arranged eccentrically to each other and revolubly connected by tine bars having pendent tines, the combination of bevel wheels having skew teeth, said bevel wheels being mounted on the road axle and gearing with bevel pinions having skew teeth mounted on the reel or spider axle which is disposed above the road axle, said reel or spider axle being carried by a bracket forming one end of a metal framework disposed around the road wheel axle and having its side bars arranged on either side of the said axle and parallel therewith, said side bars being connected by cross brackets having bearings therein for the road wheel axle, said metal framework being rigidly connected to two braced stays extending rearwardly and backwardly and upwardly inclined from the road wheel axle for a part of their length and then bent downwardly and secured together at their rearward ends, said ends supporting a bracket in which is mounted the horn of the caster wheel and the pin upon which the rearwardly disposed reel rotates.

12. A side delivery rake of the type having two reels arranged eccentrically to each other and revolubly connected by tine bars having pendent tines, in combination pins on the two reels oppositely inclined to the respective axes of the reels, swiveling eye pins mounted on said inclined pins, pendent tine bars connected to said swiveling eye pins, a framework formed of metal bars positioned on each side of the road wheel axle and parallel thereto, cross brackets connected to said bars having bearings therein for the road wheel axle, said framework and brackets carrying at one end the axle of the inwardly disposed reel, braced stays connected to said framework and cross brackets extending rearwardly and inclined upwardly for a part of their length and tapering toward each other, said stays being bent downwardly toward their rearward end and arranged parallel to one another, distance blocks disposed between the parallel sides, a bracket fixed to the lower end of said stays having mounted therein the horn of the caster wheel and the pin on which the rearwardly disposed reel revolves.

In testimony whereof we have signed our names to this specification in the presence of two subscribing witnesses.

JOSEPH BAMFORD.
CYRIL JOSEPH BAMFORD.

Witnesses:
 CHARLES BOSWORTH KELLEY,
 BERTHA MATILDA DEELEY.